(12) United States Patent
Zhang et al.

(10) Patent No.: US 11,900,567 B2
(45) Date of Patent: Feb. 13, 2024

(54) IMAGE PROCESSING METHOD AND APPARATUS, COMPUTER DEVICE, AND STORAGE MEDIUM

(71) Applicant: Tencent Technology (Shenzhen) Company Limited, Shenzhen (CN)

(72) Inventors: Kaihao Zhang, Shenzhen (CN); Wenhan Luo, Shenzhen (CN); Hongdong Li, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 461 days.

(21) Appl. No.: 17/246,419

(22) Filed: Apr. 30, 2021

(65) Prior Publication Data

US 2021/0256663 A1 Aug. 19, 2021

Related U.S. Application Data

(63) Continuation of application No. PCT/CN2020/077720, filed on Mar. 4, 2020.

(30) Foreign Application Priority Data

Mar. 7, 2019 (CN) .......................... 201910171831.8

(51) Int. Cl.
*G06K 9/00* (2022.01)
*G06T 5/00* (2006.01)
(Continued)

(52) U.S. Cl.
CPC .............. *G06T 5/002* (2013.01); *G06N 3/045* (2023.01); *G06N 3/084* (2013.01); *G06T 5/50* (2013.01);
(Continued)

(58) Field of Classification Search
CPC ........... G06T 5/002; G06T 5/50; G06T 7/254; G06T 2207/20081; G06T 2207/20084;
(Continued)

(56) References Cited

U.S. PATENT DOCUMENTS

2018/0121767 A1\* 5/2018 Wang ..................... G06F 18/217
2020/0117949 A1\* 4/2020 Kimura ................. G06T 3/4053

FOREIGN PATENT DOCUMENTS

CN 108376387 A 8/2018
CN 108509961 A 9/2018
(Continued)

OTHER PUBLICATIONS

Zhang, Kaihao, et al. "Adversarial spatio-temporal learning for video deblurring." IEEE Transactions on Image Processing 28.1 (2018): 291-301. (Year: 2018).\*
(Continued)

*Primary Examiner* — Andrew M Moyer
(74) *Attorney, Agent, or Firm* — Morgan, Lewis & Bockius LLP

(57) ABSTRACT

An image processing method comprises training an initial network to obtain a first network. The method also comprises training the first network to obtain a second network. The method also comprises training the second network to obtain a third network. The method also comprises processing an original image according to the third network in response to receiving an image processing instruction, to obtain a plurality of target images from the original image.

20 Claims, 9 Drawing Sheets

(51) Int. Cl.
  *G06T 7/254* (2017.01)
  *G06N 3/084* (2023.01)
  *G06T 5/50* (2006.01)
  *G06N 3/045* (2023.01)

(52) U.S. Cl.
  CPC .... *G06T 7/254* (2017.01); *G06T 2207/20081* (2013.01); *G06T 2207/20084* (2013.01)

(58) Field of Classification Search
  CPC ........... G06T 5/003; G06T 7/00; G06N 3/045; G06N 3/084; G06N 20/00; Y02T 10/40
  See application file for complete search history.

(56) References Cited

FOREIGN PATENT DOCUMENTS

| CN | 108510456 A | 9/2018 |
|---|---|---|
| CN | 109919874 A | 6/2019 |
| WO | WO 2018161775 A1 | 9/2018 |

OTHER PUBLICATIONS

Zhang, Kaihao, et al. "Deblurring by realistic blurring." Proceedings of the IEEE/CVF Conference on Computer Vision and Pattern Recognition. 2020. (Year: 2020).*
Tencent Technology, ISR, PCT/CN2020/077720, Jun. 9, 2020, 2 pgs.
Tencent Technology, WO, PCT/CN2020/077720, Jun. 9, 2020, 5 pgs.
Tencent Technology, IPRP, PCT/CN2020/077720, Aug. 25, 2021, 6 pgs.
Tencent Technology, KR Office Action, Korean Patent Application No. 10-2021-7023365, dated Aug. 12, 2022, 19 pgs.
Extended European Search Report, EP20767168.6, dated Apr. 7, 2022, 8 pgs.
Ian J. Goodfellow et al., "Generative Adversarial Nets", NIPS'14 Proceedings of the 27th International Conference on Neural Information Processing Systems, vol. 2, Dec. 8, 2014, pp. 1-9, XP055572979, Retrieved from the Internet: https://proceedings.neurips.cc/paper/2014/file.5ca3e9b122f61f8f06494c97blafccf3-Paper.pdf.
Kaihao Zhang et al., "Adversarial Spatio-Temporal Learning for Video Deblurring", arxiv.org, Cornell University Library, Ithaca, NY, Mar. 28, 2018, XP081091934, 11 pgs.

* cited by examiner

IMAGE PROCESSING METHOD AND APPARATUS, COMPUTER DEVICE, AND STORAGE MEDIUM

CROSS-REFERENCE TO RELATED APPLICATIONS

This application is a continuation application of PCT Patent Application No. PCT/CN2020/077720, entitled "IMAGE PROCESSING METHOD AND APPARATUS, AND COMPUTER DEVICE AND STORAGE MEDIUM" filed on Mar. 4, 2020, which claims priority to Chinese Patent Application No. 201910171831.8, filed with the State Intellectual Property Office of the People's Republic of China on Mar. 7, 2019, and entitled "IMAGE PROCESSING METHOD AND APPARATUS, COMPUTER DEVICE, AND STORAGE MEDIUM", all of which are incorporated herein by reference in their entirety.

FIELD OF THE TECHNOLOGY

This application relates to the field of image processing, and in particular, to an image processing method and apparatus, a computer device, and a storage medium.

BACKGROUND OF THE DISCLOSURE

With the popularity of mobile terminals, in the process of capturing an image by using a mobile terminal, the captured image can be easily blurred due to a jitter of the device or motion of a shot object. To restore blurred images, in recent years, blurred images are usually processed by using a convolutional neutral network.

Currently, a blurred image may be simultaneously inputted into at least one convolutional neural network, the at least one convolutional neural network is arranged in parallel, and each convolutional neural network outputs a clear image, so that at least one clear image can be obtained. The blurred image is any image with a definition less than a preset value.

In the foregoing parallel convolutional neural network architecture, due to the lack of interaction between the convolutional neural networks arranged in parallel, the information exchange capability of the convolutional neural networks in the foregoing network architecture is weak, and when a larger quantity of clear pictures are required, a larger quantity of convolutional neutral networks need to be trained. Because the quantity of the convolutional neutral networks is increased, an amount of calculation in one image processing process is also increased.

SUMMARY

According to various embodiments provided in this application, an image processing method and apparatus, a computer device, and a storage medium are provided.

In accordance with some embodiments, an image processing method is provided, performed by a computer device, the method including:

training an initial network, to obtain a first network;

processing a first sample image that includes a blurry object using the first network to obtain a plurality of first processing images with definitions greater than that of the first sample image;

synthesizing at least one second sample image according to the plurality of first processing images; training the first network, to obtain a second network; processing the at least one second sample image using the second network to obtain a plurality of second processing images with definitions greater than that of the at least one second sample image and including motion differences of the object;

synthesizing at least one third sample image according to the plurality of second processing images;

training the second network, to obtain a third network;

processing the at least one third sample image using the third network to obtain a plurality of third processing images with definitions greater than that of the at least one third sample image and including the motion differences of the object and recovering hidden information in the at least one third sample image; and processing an original image using the third network in response to receiving an image processing instruction, to obtain a plurality of target images from the original image.

In accordance with some embodiments, an image processing apparatus is provided, comprising:

a training module, configured to train an initial network, to obtain a first network, the first network being used for obtaining, based on a first sample image, a plurality of first processing images with definitions greater than that of the first sample image;

the training module, further configured to train the first network, to obtain a second network, the second network being used for obtaining, based on a second sample image, a plurality of second processing images with definitions greater than that of the second sample image and with a motion difference;

the training module, further configured to train the second network, to obtain a third network, the third network being used for obtaining, based on a third sample image, a plurality of third processing images with definitions greater than that of the third sample image, with a motion difference, and recovering hidden information in the third sample image; and a processing module, configured to process an original image according to the third network in response to receiving an image processing instruction, to obtain a plurality of target images.

In some embodiments, a non-volatile (e.g., non-transitory) computer readable storage medium storing computer-readable instructions is provided, the computer-readable instructions, when executed by one or more processors, cause the one or more processors to perform any of the methods described herein.

In some embodiments, a computer device is provided. The computer device includes memory and one or more processors, the memory storing computer readable instructions, the computer readable instructions, when executed by the one or more processors, cause the one or more processors to perform any of the methods disclosed herein.

Details of one or more embodiments of this application are provided in the accompanying drawings and descriptions below. Other features, objectives, and advantages of this application become apparent from the specification, the accompanying drawings, and the claims.

BRIEF DESCRIPTION OF THE DRAWINGS

To describe the technical solutions of the embodiments of this application more clearly, the following briefly introduces the accompanying drawings required for describing the embodiments. Apparently, the accompanying drawings in the following description show only some embodiments of this application, and a person of ordinary skill in the art may still derive other drawings from these accompanying drawings without creative efforts.

DESCRIPTION OF EMBODIMENTS

To make the objectives, technical solutions, and advantages of this application clearer, the following further describes this application in detail with reference to the accompanying drawings and the embodiments. It is to be understood that the specific embodiments described herein are merely used to explain this application but are not intended to limit this application.

Figure 1:
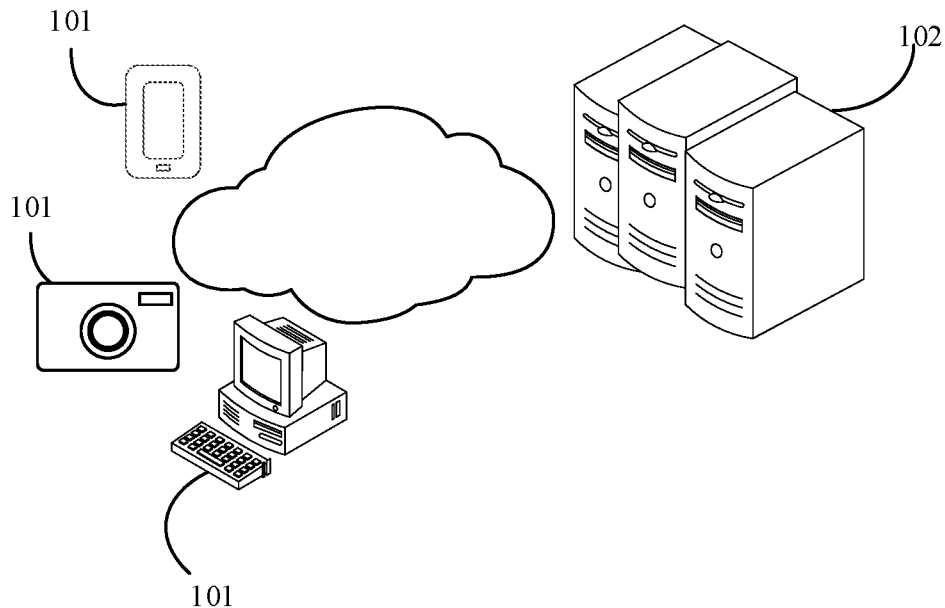
FIG. 1 is a schematic diagram of an implementation environment of an image processing method according to an embodiment of this application.

FIG. 1 is a schematic diagram of an implementation environment of an image processing method according to an embodiment of this application. Referring to FIG. 1, the implementation environment may include at least one terminal 101 and a server 102.

The terminal 101 may be any electronic device that can provide an image processing service, so that an initial network can be trained on the terminal 101. When the terminal 101 detects a trigger operation of an image processing instruction, the terminal 101 may be triggered to process an original image according to a trained network, to obtain a plurality of target images. The plurality of target images are multi-frame dynamic images reconstructed based on the original image and with definitions greater than that of the original image. For example, the terminal 101 may be a digital camera. When a user shoots a blurred image with a definition less than a preset value, an image processing instruction may be triggered, to obtain the plurality of target images.

In some embodiments, the initial network may be trained on the server 102. When detecting the trigger operation of the image processing instruction, the terminal 101 sends the image processing instruction carrying the original image to the server 102, the server 102 processes the original image according to the image processing instruction, generates the plurality of target images, and sends the plurality of target images to the terminal 101.

The server 102 may be a computer device that can provide an image processing service. The server may train a generative network by using at least one sample image in at least one training set, to perform image processing according to a trained network. Certainly, the server 102 may store a training database, to store an original image carried in an image processing instruction into any training set of the training database each time the image processing instruction is received, to obtain more sample images.

Figure 2:
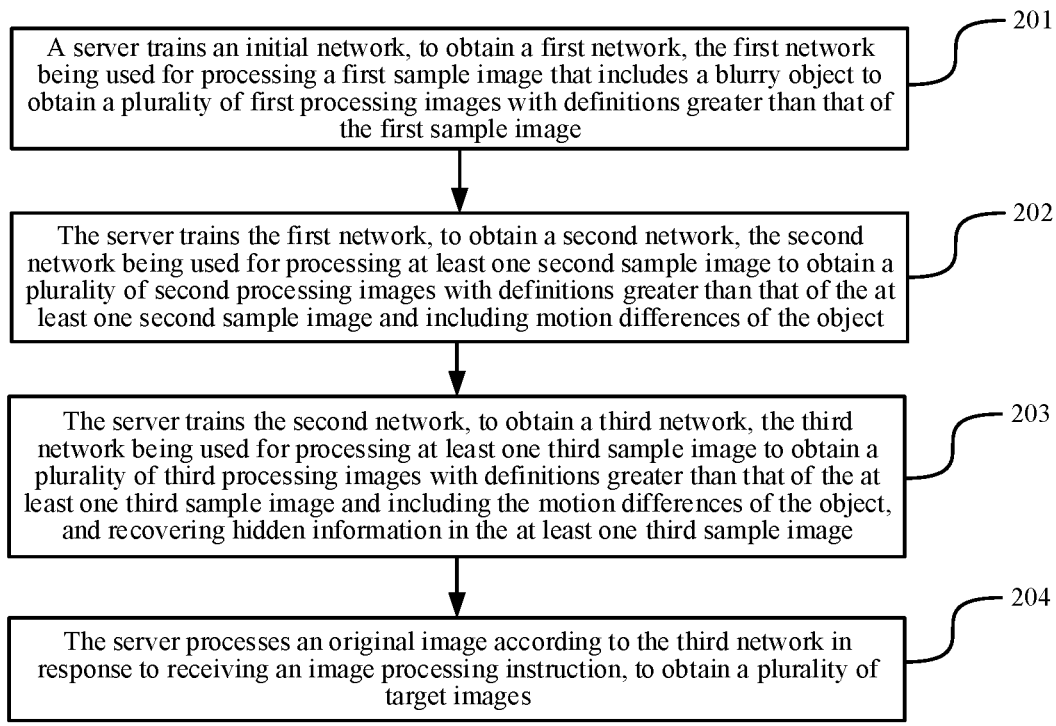
FIG. 2 is a flowchart of an image processing method according to an embodiment of this application.

Based on the foregoing implementation environment, that an image processing method in the embodiments of this application is applied to a computer device is described below. The computer device may be a server. FIG. 2 is a flowchart of an image processing method according to an embodiment of this application. Referring to FIG. 2, this embodiment includes:

201. A server trains an initial network, to obtain a first network. The first network is used for processing a first sample image that includes a blurry object to obtain a plurality of first processing images having definitions greater than that of the first sample image. In some embodiments, the server synthesizes at least one second sample image according to the plurality of first processing images.

202. The server trains the first network, to obtain a second network, The second network is used for processing the at least one second sample image to obtain a plurality of second processing images having definitions greater than that of the at least one second sample image and including motion differences of the object. In some embodiments, the server synthesizes at least one third sample image according to the plurality of second processing images.

203. The server trains the second network, to obtain a third network. The third network is used for processing the at least one third sample image to obtain a plurality of third processing images having definitions greater than that of the at least one third sample image, including motion differences of the object, and recovering hidden information in the at least one third sample image.

204. The server processes an original image using the third network in response to receiving an image processing instruction, to obtain a plurality of target images from the original image.

According to the image processing method provided in this embodiment of this application, the server trains the initial network to obtain the first network, to train a deblurring capability of a convolutional neutral network; trains the first network, to obtain the second network, to train a capability of outputting, by the convolutional neutral network, a plurality of processing images with a motion difference; trains the second network to obtain the third network, to train a capability of restoring, by the convolutional neutral network, the hidden information in the sample image, so that when receiving the image processing instruction, the server can process the original image according to the third network, to obtain a plurality of target images. A plurality of target images with definitions greater than that of the original image, having motion differences of the object, and recovering the hidden information in the original image are outputted by using only one convolutional neutral network. Therefore, information exchange capabilities of the convolutional layers in the network are strong. When a larger quantity of clear pictures are required, compared with a parallel network architecture, an amount of calculation in each image processing process is reduced, to improve image processing efficiency.

Figure 3:
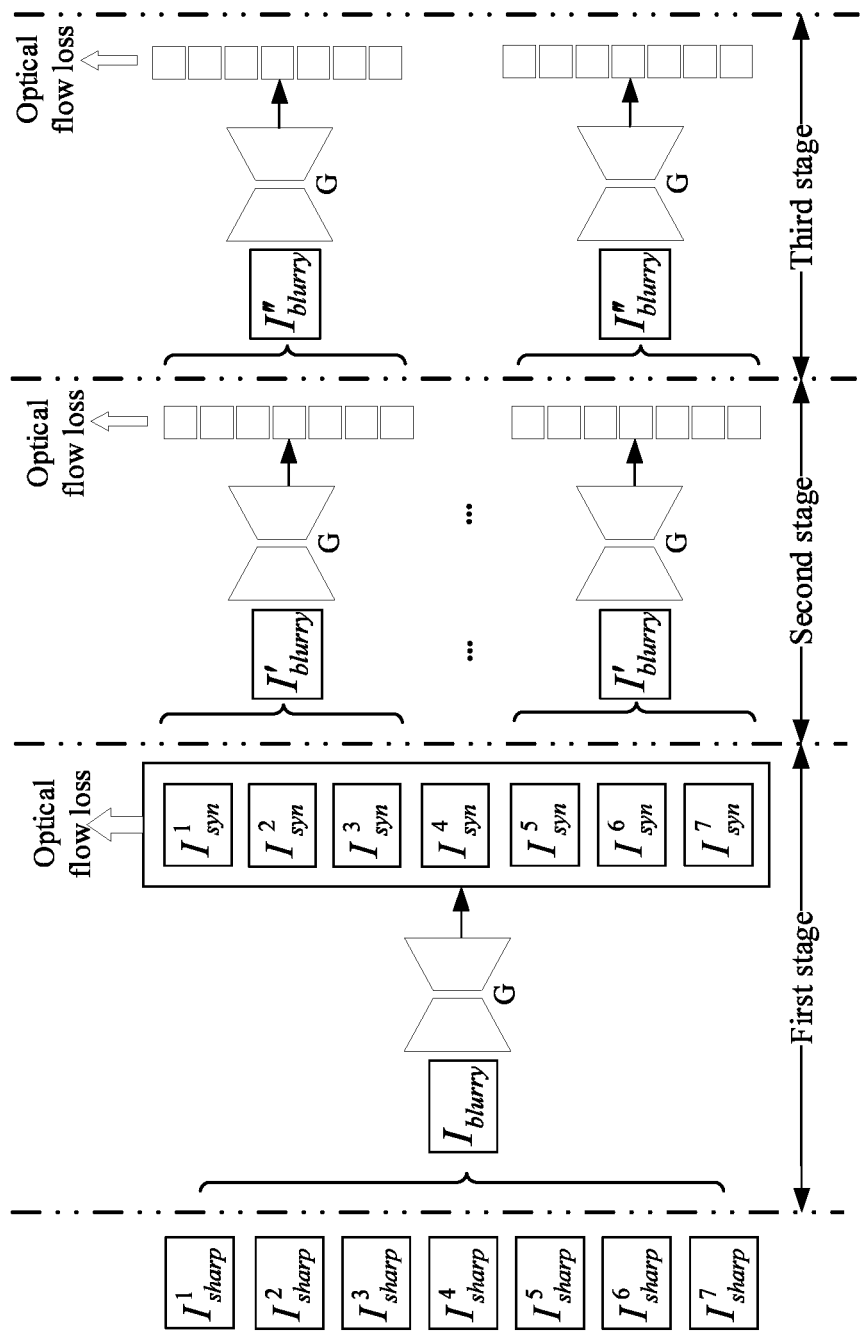
FIG. 3 is a schematic diagram of an image processing method according to an embodiment of this application.

Based on the foregoing embodiment, FIG. 3 is a schematic diagram of an image processing method according to an embodiment of this application. As shown in FIG. 3, it can be learned that the process of training the initial network to obtain the third network may be divided into three stages. At the first stage, the server trains the initial network to obtain the first network. In some embodiments, at the second stage, the server trains the first network to obtain the second network. At the third stage, the server trains the second network to obtain the third network.

Figure 4:
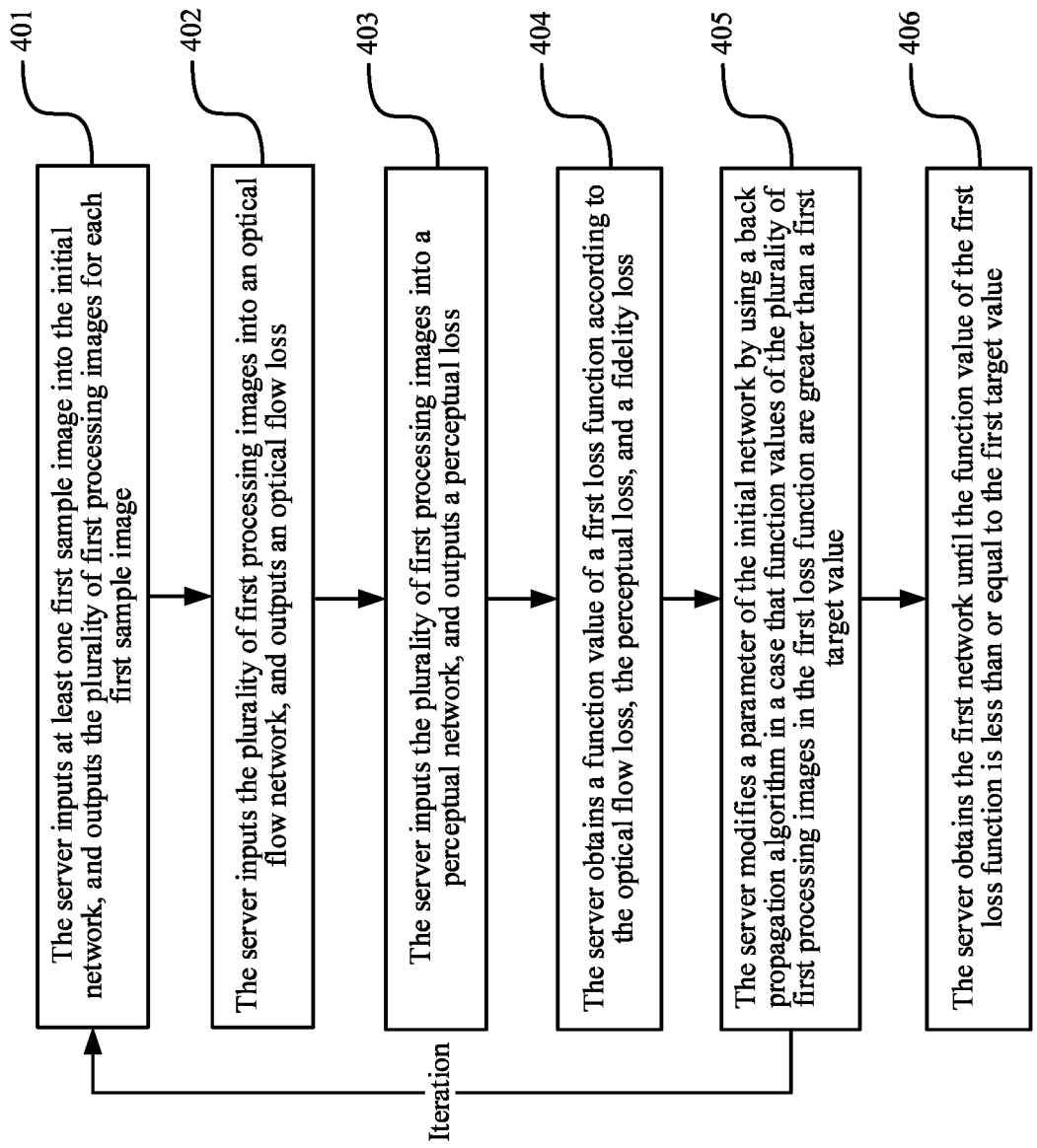
FIG. 4 is a flowchart of training an initial network according to an embodiment of this application.

Based on the foregoing three training stages, the training process of the first stage is described in detail below. FIG. 4 is a flowchart of training an initial network according to an embodiment of this application. Referring to FIG. 4, this embodiment includes:

401. The server inputs at least one first sample image into the initial network, and outputs the plurality of first processing images for each first sample image.

The at least one first sample image is a to-be-processed blurred image (e.g., the at least one first sample image includes a blurry object in the image). The blurred image may be an image with a definition less than a first preset threshold. The plurality of first processing images comprises a plurality of clear images obtained by deblurring the first sample image. For example, the clear image may be an image with a definition greater than that of the blurred image, or an image with a definition greater than that of the blurred image, and greater than a second preset threshold. The second preset threshold is any value greater than the first preset threshold. Values of the first preset threshold and the second preset threshold are not limited in this embodiment of this application.

Figure 5:
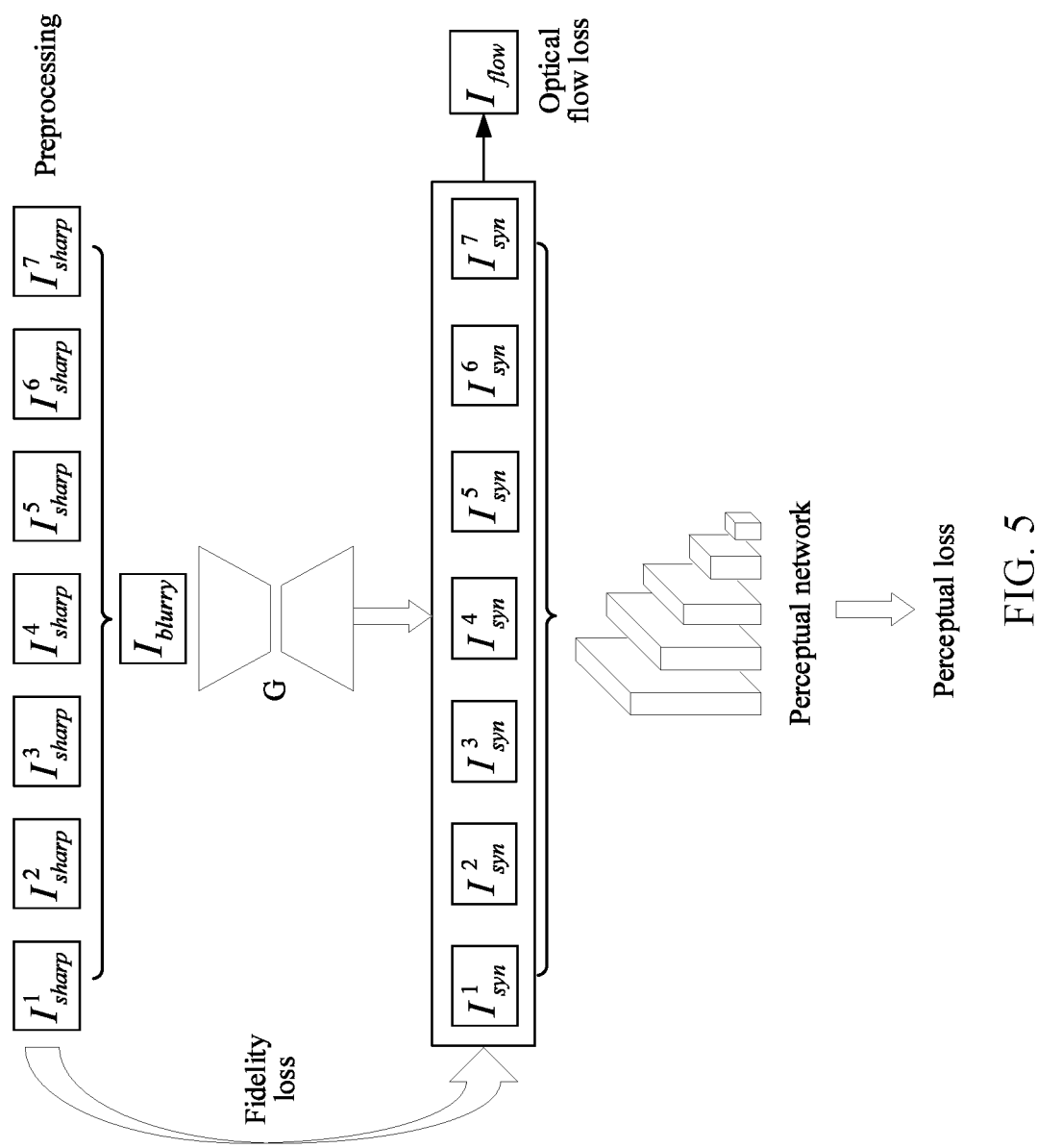
FIG. 5 is a schematic diagram of training an initial network according to an embodiment of this application.

FIG. 5 is a schematic diagram of training an initial network according to an embodiment of this application. As shown in FIG. 5, training of the initial network is described below separately from two processes: input and output.

(1) In the input process of step 401, for each first sample image, the server may first decode the first sample image, to obtain a permutation matrix of pixels in the first sample image, and input the permutation matrix into the initial network. In some implementations, the first sample image may be a single-channel image (corresponding to a one-dimensional permutation matrix), or a multi-channel image (corresponding to a multidimensional permutation matrix). A quantity of channels of the first sample image is not limited in this embodiment of this application. For example, the first sample image may be a red green blue (RGB) three-channel image, so that a three-dimensional matrix of pixels can be obtained by decoding the first sample image.

In some embodiments, the server may obtain the first sample image by using a preprocessing process. To be specific, the server synthesizes a plurality of clear images with a motion difference ($I_{sharp}$ shown in FIG. 5) into a blurred first sample image ($I_{blurry}$ shown in FIG. 5), to facilitate obtaining a plurality of first processing images ($I_{syn}$ shown in FIG. 5), and difference information between the plurality of clear images $I_{sharp}$ thereby facilitating obtaining a first loss function. The plurality of clear images may be images successively shot in a dynamic motion process of a person, or successive video image frames intercepted in a video. The plurality of clear images may be locally stored, or may be from cloud. A method of obtaining the plurality of clear images is not limited in this embodiment of this application.

In some implementations, when there is relatively sufficient training data, the server may not perform the preprocessing process. Instead, the database stores at least one training set. Each training set includes at least one first sample image. The server may obtain all first sample images in the at last one training set as the at least one first sample image, to directly extract existing training data in the database, and avoid preprocessing the first sample image, thereby improving the training efficiency of the initial network.

In the foregoing process, the initial network includes at least one hidden layer, the at least one hidden layer is connected in series to each other, and an output map of a previous hidden layer may be used as an input map of a current hidden layer. In some implementations, each hidden layer includes a convolutional layer, a normalization layer, and a nonlinear layer. This is similar to a tandem connection situation of the foregoing at least one hidden layer.

The convolutional layer is used for performing convolution, to extract feature information. The convolutional layer may include at least one convolution kernel. Each convolution kernel is used for indicating a weight matrix during each convolution operation. The normalization layer is used for normalizing an output map of a previous convolutional layer. The nonlinear layer is used for adding a nonlinear activation function to an output map of a previous normalization layer.

In an architecture of the foregoing initial network, using an $i^{th}$ hidden layer as an example, an output map of a nonlinear layer in an $(i-1)^{th}$ hidden layer is inputted into a convolutional layer of the $i^{th}$ hidden layer, an output map of the convolutional layer of the $i^{th}$ hidden layer is inputted into a normalization layer of the $i^{th}$ hidden layer, an output map of the normalization layer of the $i^{th}$ hidden layer is inputted into a nonlinear layer of the $i^{th}$ hidden layer, and an output map of the nonlinear layer of the $i^{th}$ hidden layer is inputted into a convolutional layer of an $(i+1)^{th}$ hidden layer, and so on. i is any positive integer greater than or equal to 1. To be specific, the $i^{th}$ hidden layer may be any hidden layer in the path. Both the foregoing input map and output map are feature maps.

In some embodiments, the server may set a quantity of convolution kernels in a convolutional layer of a last hidden layer according to a quantity of channels of the first sample image, to control the quantity of the plurality of first processing images outputted by the initial network. In one implementation, when the quantity of channels of the first sample image is N, the quantity of convolution kernels in the convolutional layer in the last hidden layer is set to N*K, so that the quantity of the plurality of outputted first processing images can be controlled to K. N and K are positive integers. For example, when the first sample image is a three-channel image, the quantity of convolution kernels may be set to 21, so that after the first sample image is inputted into the initial network, seven three-channel first processing images may be outputted.

(2) Based on the foregoing situation, in the output process of step 401, for each first sample image, the server may sequentially input the at least one hidden layer, and output the plurality of first processing images, so that the plurality of first processing images are obtained by using a single initial network, thereby avoiding a cumbersome architecture of constructing a plurality of convolutional neutral networks to obtain the plurality of first processing images, reducing an amount of calculation in one image processing process, and optimizing the image processing logic.

In some implementations, when the hidden layers are connected to each other, a residual block may alternatively be introduced. For each hidden layer, an output map of a nonlinear layer of a previous hidden layer may be superposed with an output map of a normalization layer of a current hidden layer to obtain the residual block. The residual block is used as an input map of a nonlinear layer of the current hidden layer. In this way, the problem of neural network degradation is resolved, and a larger depth of the initial network indicates a better image processing effect.

In some implementations, in the foregoing normalization layer, a linear operation is performed by using batch normalization (BN). For any input map with a single-dimensional or multidimensional characteristic matrix, an average value and a variance of matrix dots in each dimension are obtained, the matrix dots in the dimension are normalized according to the average value and the variance, and linear transformation is performed on the normalized matrix dots, to obtain a multidimensional characteristic matrix of the output map. By using the foregoing BN operation, an output map of each hidden layer may be enabled to have similar distribution, thereby accelerating a training speed of the initial network, and improving the problem of gradient diffusion of the initial network.

In some implementations, the activation function used in the foregoing nonlinear layer may be a sigmoid function, a tan h function, an ReLU function, or the like. In some embodiments, when the ReLU function is used, an amount of calculation of the nonlinear layer may be reduced, to avoid the problem of gradient disappearance that easily occurs during back propagation of a deep network.

In some embodiments, the hidden layer may alternatively not include a normalization layer. To be specific, each hidden layer includes only a convolutional layer and a nonlinear layer, to simplify the architecture of the initial network. Certainly, the hidden layer may alternatively not include a normalization layer and a nonlinear layer, and feature extraction is performed on the input map only by using the convolutional layer, thereby further simplifying the architecture of the initial network.

In some embodiments, to ensure that sizes of the first sample image and the first processing images are not changed, the server may further perform zero padding in each convolution process, so that the size of the characteristic matrix remains unchanged after each convolution.

402. The server inputs the plurality of first processing images into an optical flow network, and outputs an optical flow loss.

The optical flow network is used for calculating the optical flow loss between the plurality of first processing images and the first sample image. The optical flow loss indicates spatial-temporal association information (motion difference) of an object between the plurality of first processing images and the first sample image.

In some embodiments, the optical flow network may include a contraction portion and an enlarging portion. The contract portion is used for extracting, in depth, feature information of the plurality of first processing images. The enlarging portion is used for restoring an output map of the contraction portion to a high definition.

The foregoing contraction portion may include at least one hidden layer. Each hidden layer may include a convolutional layer, a nonlinear layer, and a pooling layer according to a connection sequence. The convolutional layer and the nonlinear layer are similar to the initial network described in step 401, and reference may be correspondingly made. The pooling layer is used for compressing an output map processed by the convolutional layer and the nonlinear layer, reduces the size of the output map, to facilitate extracting deeper spatial-temporal association information, and also simplify calculation complexity of the optical flow network.

In some implementations, in the foregoing contraction portion, convolution operation may also be performed by using a dilated convolution method, to effectively expand a receptive field, extract more spatial-temporal association information, and reduce an amount of calculation of the optical flow network.

In the foregoing enlarging portion, at least one enlarging method in an uppooling method, an upsampling method, and a deconvolution (or referred to as transposed convolution) method may be used, to increase a size of the output map of the contraction portion, and increase a resolution of the output map of the contraction portion.

In the foregoing process, for the plurality of first processing images, the server may extract, by using the optical flow network, changes of pixels of the plurality of first processing images in time domain and spatial domain relative to pixels of the first sample image (namely, the spatial-temporal association information), to obtain a pixel correspondence between the pixels in the first processing images and the pixels in the first sample image. The server may obtain the optical flow loss of the object between the first processing images and the first sample image according to the pixel correspondence.

In some embodiments, a loss function of the optical flow loss in step 402 may be represented as:

$$L_{flow} = \frac{1}{WH}\sum_{x=1}^{W}\sum_{y=1}^{H}(I_{flow}^{x,y} - G(I_{blurry}^{x,y}))^2 \quad (1)$$

In the foregoing formula, $I_{blurry}$ represents the first sample image (namely, an input image of the initial network), G represents a function of the initial network, so that $I_{blurry}$ can represent the first processing image (namely, the first sample image processed by the initial network), x represents a position of a pixel of the first processing image in a width direction, y represents a position of the first processing image in a height direction, W represents a width of the first processing image, H represents a height of the first processing image, and $I_{flow}$ represents a feature map that is extracted by the optical flow network and that represents spatial-temporal association information of the first processing image, so that $L_{flow}$ can represent spatial-temporal association information between the plurality of first processing images and the original clear image.

403. The server inputs the plurality of first processing images into a perceptual network, and outputs a perceptual loss.

The perceptual network is used for calculating the perceptual loss between the plurality of first processing images and the clear image for synthesizing the first sample image. The perceptual loss indicates a high-level feature loss between the plurality of first processing images and the clear image.

In some embodiments, the perceptual network may be a pre-trained visual geometry group (VGG) network (VGG-Net) and can measure a similarity between the plurality of first processing images and the clear image in perception, thereby assessing a deblurring effect of the initial network. For example, the perceptual network is a VGG-16 or a VGG-19. The architecture of the perceptual network is not limited in this embodiment of this application.

Using an example in which the perceptual network is a VGG-16, the VGG-16 includes 16 hidden layers, a 3*3 small convolution kernel and a 2*2 maximum pooling layer are used in each hidden layer. With deepening of the network, the size of the image is reduced by a half and the depth of the image is increased by a half after each pooling operation, so that the structure of the perceptual network is simplified, thereby facilitating extracting a high-level feature loss.

In some embodiments, a loss function of the perceptual loss in step 403 may be represented as:

$$L_{perceptual} = \|\Phi(I_{sharp}) - \Phi(G(I_{blurry}))\| \tag{2}$$

In the foregoing formula, $I_{sharp}$ represents a clear image used for synthesizing the first sample image (namely, a clear image used during preprocessing of the first sample image), $I_{blurry}$ represents the first sample image (namely, an input image of the initial network), G represents a function of the initial network, so that $G(I_{blurry})$ can represent the first processing image (namely, the first sample image processed by the initial network), $\Phi$ represents a function of the perceptual network, so that $L_{perceptual}$ can represent a high-level feature loss between the first processing image and the original clear image.

In the foregoing process, during the preprocessing, the first sample image can be synthesized by using the clear image. This is equivalent to blurring the clear image. Then the blurred first sample image is inputted into the initial network G, and the first processing image $G(I_{blurry})$ is outputted. This is equivalent to restoring a definition of the first sample image. Therefore, a better deblurring effect of the initial network G indicates a higher similarity of the first processing image $G(I_{blurry})$ to the original clear image, and the loss function $L_{perceptual}$ of the perceptual loss approaches 0, so that the deblurring effect of the initial network G can be assessed according to the value of the loss function $L_{perceptual}$.

404. The server obtains a function value of a first loss function according to the optical flow loss, the perceptual loss, and a fidelity loss.

In the foregoing process, the first loss function is used for ensuring that definitions of the plurality of first processing images are greater than that of the first sample image, and the first loss function $L_1$ may include the optical flow loss $L_{flow}$, the perceptual loss $L_{perceptual}$, and a fidelity loss $L_{MSE}$, and may be represented by using the following formula:

$$\begin{aligned} L_1 &= L_{flow} + L_{MSE} + L_{perceptual} \\ &= \frac{1}{WH}\sum_{x=1}^{W}\sum_{y=1}^{H}(I_{flow}^{x,y} - G(I_{blurry}^{x,y}))^2 + \frac{1}{WH}\sum_{x=1}^{W}\sum_{y=1}^{H}(I_{sharp}^{x,y} - G(I_{blurry}^{x,y}))^2 + \\ &\quad \|\Phi(I_{sharp}) - \Phi(G(I_{blurry}))\| \\ &= \frac{1}{WH}\sum_{x=1}^{W}\sum_{y=1}^{H}[(I_{flow}^{x,y} - G(I_{blurry}^{x,y}))^2 + (I_{sharp}^{x,y} - G(I_{blurry}^{x,y}))^2] + \\ &\quad \|\Phi(I_{sharp}) - \Phi(G(I_{blurry}))\| \end{aligned} \tag{3}$$

Function terms of the optical flow loss $L_{flow}$ and the perceptual loss $L_{perceptual}$ are described in step 403, and reference may be correspondingly made. In the function term of the fidelity loss $L_{MSE}$, meanings of x, y, W, and H are the same as those in the optical flow loss $L_{flow}$.

In the foregoing process, the fidelity loss is used for representing a result obtained by calculating a mean square error (MSE) pixel by pixel between the first processing images and the clear image. By collaboratively considering contributions of the optical flow loss, the fidelity loss, and the perceptual loss, not only the differences between the first processing images and the clear image in pixels and spatial-temporal association information can be measured, but also more precise parameter adjustment can be performed in consideration of the difference between the first processing images and the clear image in perception.

405. The server modifies a parameter of the initial network by using a back-propagation algorithm when function values of the plurality of first processing images in the first loss function are greater than a first target value.

The first target value may be any value greater than 0 and less than 1. The backpropagation (BP) algorithm is repeated cycling iterations of two links: activation propagation and weight updating.

In some implementations, the first target value may be 0.01, so that when the function value of the first loss function is greater than 0.01, the server modifies the parameter of the initial network by using the back propagation algorithm.

In the foregoing process, if the function value of the first loss function is greater than the first target value, a basis of modifying the weight matrix may be obtained by using a chain rule formula, thereby modifying the parameter of the initial network according to the basis.

406. The server iteratively performs the foregoing steps 401 to 405, and obtains the first network until the function value of the first loss function is less than or equal to the first target value.

The first network is used for obtaining, based on the first sample image, the plurality of first processing images with definitions greater than that of the first sample image.

By using step 405, if the function value of the first loss function does not meet the expectation, parameter modification may be performed on the initial network by using the back propagation algorithm, to iteratively perform the operations performed in steps 401 to 405, until the function value of the first loss function is less than or equal to the first target value at a time. In this case, it can be considered that the training of the deblurring capability of the initial network is completed, so that the initial network whose deblurring capability is trained is used as the first network.

In steps 401 to 406, the server trains the initial network according to the first loss function, to obtain the first network, thereby completing training at the first stage, so that the first network can output the plurality of first processing images with definitions greater than that of the first sample image. In some implementations, the server may alternatively not obtain the optical flow loss and/or the perceptual loss, to simplify the training process.

Figure 6:
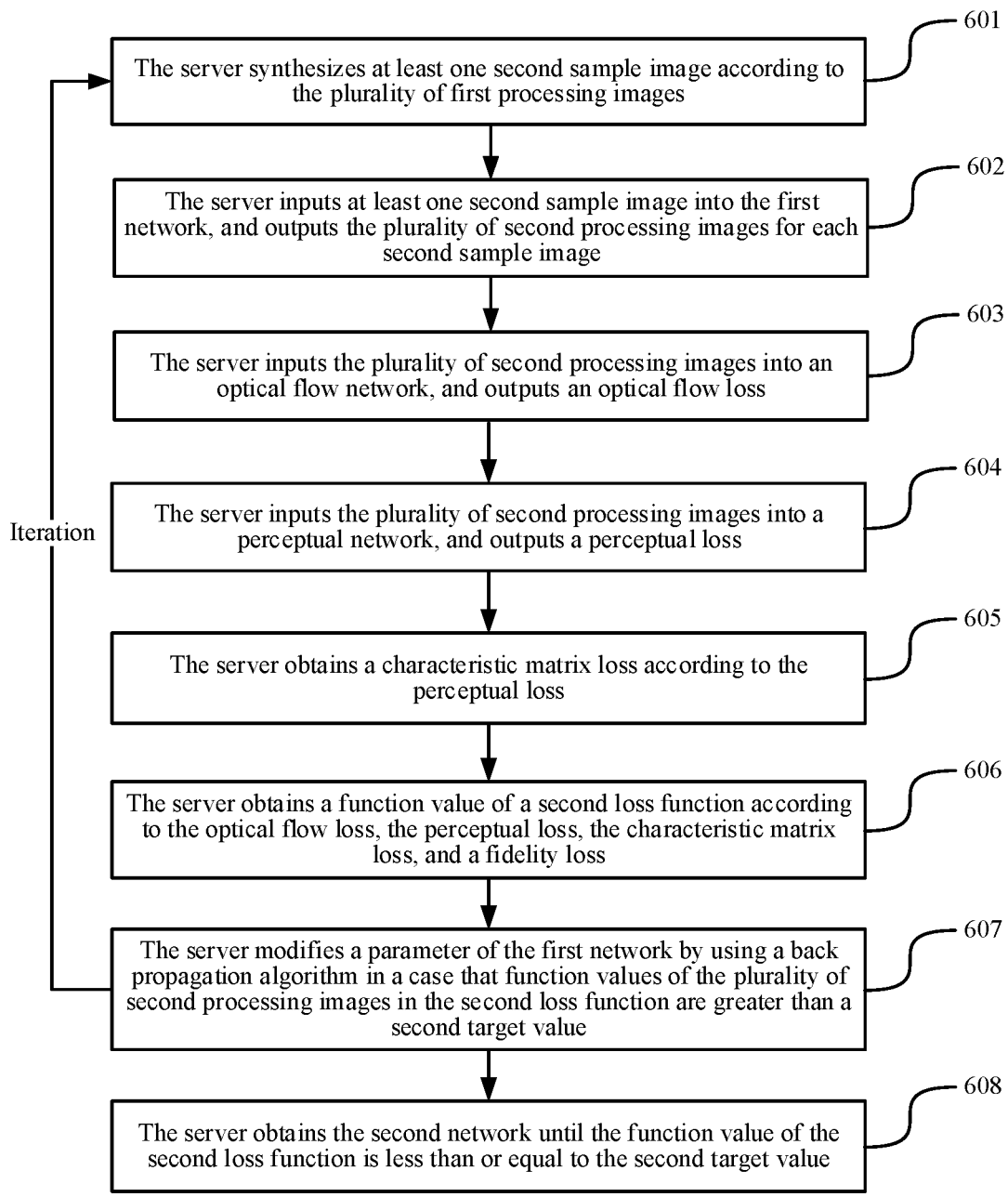
FIG. 6 is a flowchart of training a first network according to an embodiment of this application.

Based on the training at the first stage, a training method at the second stage provided in this embodiment of this application may be performed. FIG. 6 is a flowchart of training a first network according to an embodiment of this application. Referring to FIG. 6, the training method at the second stage is described below in detail.

601. The server synthesizes at least one second sample image according to the plurality of first processing images.

Figure 7:
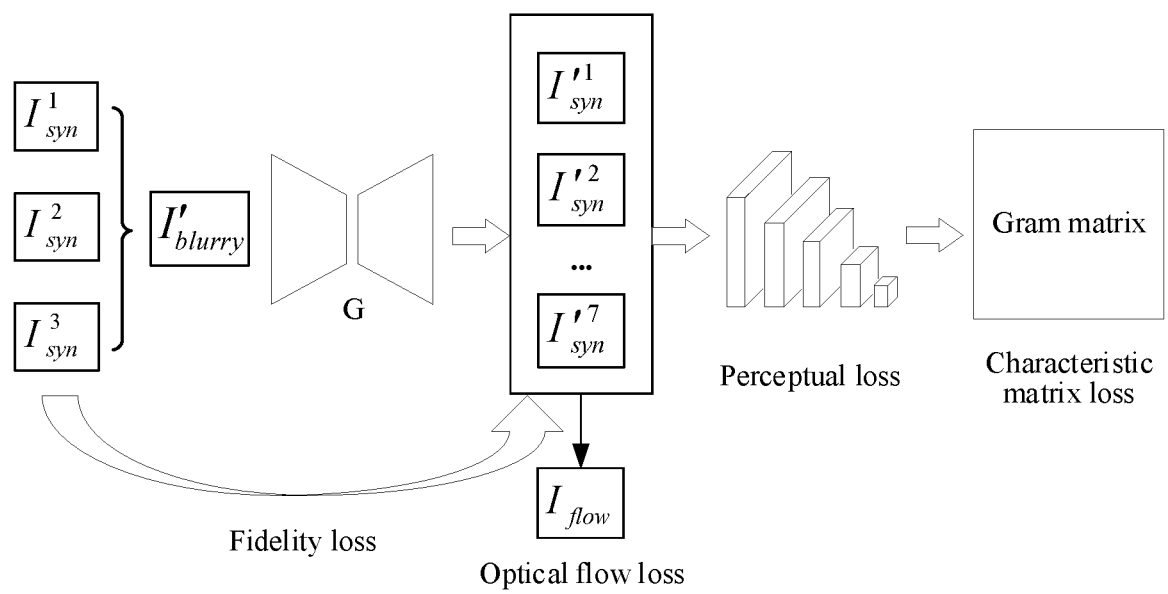
FIG. 7 is a schematic diagram of training a first network according to an embodiment of this application.

FIG. 7 is a schematic diagram of training a first network according to an embodiment of this application. As shown in FIG. 7, in the foregoing process, the server may use average values of pixels of the plurality of first processing images as values of pixels of the second sample image. For example, when the initial network outputs seven first processing images, the server may calculate a sum of pixel values of pixels at positions corresponding to the seven first processing images, and then divide the sum by 7, to obtain the second sample image.

Certainly, based on the foregoing example, the server may alternatively randomly select three first processing images in the seven first processing images, calculate a sum of pixel values of pixels at positions corresponding to the three first processing images, and then divide the sum by 3, to obtain a second sample image. A similar operation may also be performed in the remaining four first processing images. Three first processing images are selected to calculate pixel average values, thereby obtaining another second sample image. In this way, two second sample images can be obtained by using the seven first processing images.

In step 601, the server may synthesize at least one second sample image according to the plurality of first processing images, so that when local sample capacity cannot meet a training requirement, new sample images can be constantly generated in the training process, to avoid filtering second sample images from mass Internet data, thereby reducing costs of further training the first network.

In some embodiments, the server may not obtain the second sample image by using the first processing images. To be specific, the server synthesizes a plurality of random clear images with spatial-temporal association information into a blurred second sample image, to facilitate obtaining a plurality of second processing images, and difference information between the plurality of clear images, thereby facilitating obtaining a second loss function. The plurality of clear images may be images successively shot in a dynamic motion process of a person, or successive video image frames intercepted in a video. The plurality of clear images may be stored locally or may be retrieved from the cloud. A method of obtaining the plurality of clear images is not limited in this embodiment of this application.

In some embodiments, when the database stores at least one training set, the server may alternatively not generate the second sample image according to the first processing images, but obtain all training data in the at least one training set as the at least one second sample image, thereby directly extracting existing training data from the database, and simplifying a training process of the convolutional neutral network.

602. The server inputs at least one second sample image into the first network, and outputs the plurality of second processing images for each second sample image.

Step 602 is similar to step 401. Because the deblurring capability of the initial network has been preliminary trained to obtain the first network, the second sample image is inputted into the first network for further training. Reference may be correspondingly made.

603. The server inputs the plurality of second processing images into an optical flow network, and outputs an optical flow loss.

Step 603 is similar to step 402, and reference may be correspondingly made.

604. The server inputs the plurality of second processing images into a perceptual network, and outputs a perceptual loss.

Step 604 is similar to step 403, and reference may be correspondingly made.

605. The server obtains a characteristic matrix loss according to the perceptual loss.

In the foregoing process, the server may obtain a Gram matrix by using the following formula according to the perceptual loss obtained in step 604.

$$\text{Gram} = \frac{1}{M}\sum_{i=1}^{N} F_i^T \cdot F_i \tag{4}$$

$F_i$ represents a characteristic matrix of a plurality of second processing images corresponding to an $i^{th}$ second sample image (namely, a feature map outputted after the plurality of second processing images pass through the perceptual network), $F_i^T$ represents a transposed matrix of the characteristic matrix of the plurality of second processing images corresponding to the $i^{th}$ second sample image, N represents a volume of sample data during each training, M=C*H*W, C represents a quantity of channels of the characteristic matrix $F_i$, H represents a height of the characteristic matrix $F_i$, and W represents a width of the characteristic matrix $F_i$.

In some implementations, for the plurality of second processing images corresponding to the $i^{th}$ second sample image, when $F_i^T \cdot F_i$ is calculated, inner products between every two of a plurality of features of each convolutional layer of the perceptual network may be first obtained, to obtain a Gram matrix of each convolutional layer, to calculate a Euclidean distance between corresponding convolutional layers, and use a result obtained by calculating a sum of Euclidean distances of different convolutional layers as the characteristic matrix of the plurality of second processing images corresponding to the $i^{th}$ second sample image. i is any integer greater than or equal to 1 and less than or equal to N. To be specific, for a plurality of second processing images corresponding to any second sample image, the characteristic matrix may be calculated by using the foregoing method.

In step 605, the characteristic matrix loss is used for indicating motion difference information between the first processing images and the second processing images. A function expression of a characteristic matrix loss based on a Gram matrix may be shown as follows:

$$L_{Gram} = \frac{1}{K}\sum_{i=1}^{K}\|\text{Gram}(G(I'_{blurry})) - \text{Gram}(I'_{sharp})\| \tag{5}$$

K represents a quantity of second processing images outputted by the first network each time, $I_{sharp}'$ represents a clear image used for synthesizing the second sample image (namely, the plurality of first processing images in step 601), $I_{blurry}'$ represents the second sample image (namely, an input image of the first network), G represents a function of the first network, so that $G(I_{blurry}')$ can represent the second processing image (namely, the second sample image processed by the first network), Gram represents an operation of obtaining the Gram matrix, so that $L_{Gram}$ can represent a characteristic matrix loss (namely, the motion difference information) between the second processing images and the original clear image (the first processing image).

606. The server obtains a function value of a second loss function according to the optical flow loss, the perceptual loss, the characteristic matrix loss, and a fidelity loss.

In the foregoing process, the second loss function is used for ensuring that definitions of the plurality of second processing images are greater than that of the second sample image, and there is the motion difference, and the second loss function $L_2$ may include the optical flow loss $L_{flow}'$, the perceptual loss $L_{perceptual}'$, the characteristic matrix loss $L_{Gram}'$, and a fidelity loss $L_{MSE}'$, and may be represented by using the following formula:

$$L_1 = L'_{flow} + L'_{MSE} + L'_{perceptual} + L_{Gram} \quad (6)$$

$$= \frac{1}{WH}\sum_{x=1}^{W}\sum_{y=1}^{H}[(I'^{x,y}_{flow} - G(I'^{x,y}_{blurry}))^2 + (I'^{x,y}_{sharp} - G(I'^{x,y}_{blurry}))^2] +$$

$$\|\Phi(I'_{sharp}) - \Phi(G(I'_{blurry}))\| + \frac{1}{K}\sum_{i=1}^{K}\|\text{Gram}(G(I'_{blurry})) - \text{Gram}(I'_{sharp})\|$$

Function terms of the characteristic matrix loss $L_{Gram}$ have been described in step 605, and reference may be correspondingly made. $I_{flow}'$ represents a feature map that is extracted by the optical flow network and that represents spatial-temporal association information of the second processing images, and in function terms of the perceptual loss $L_{perceptual}'$ and the fidelity loss $L_{MSE}'$, meanings of sharp blurry and $G(I_{blurry}')$ are the same as those in the characteristic matrix loss $L_{Gram}$.

In addition, x represents a position of a pixel of the second processing image in a width direction, y represents a position of a pixel of the second processing image in a height direction, W represents a width of the second processing image (the same as the width of the first processing image $I_{sharp}'$), H represents a height of the second processing image (the same as the height of the first processing image $I_{sharp}'$), and Φ represents a function of the perceptual network.

In the foregoing process, the fidelity loss is used for representing a result obtained by calculating an MSE pixel by pixel between the second processing images and the first processing images. By collaboratively considering contributions of the optical flow loss, the fidelity loss, the perceptual loss, and the characteristic matrix loss, not only the differences between the first processing images and the second processing images in pixels and spatial-temporal association information can be measured, but also more precise parameter adjustment can be performed in consideration of the differences between the first processing images and the second processing images in perception and motion.

607. The server modifies a parameter of the first network by using a back propagation algorithm when function values of the plurality of second processing images in the second loss function are greater than a second target value.

The second target value may be any value greater than 0 and less than 1. The second target value may be the same as or different from the first target value. The value of the second target value is not limited in this embodiment of this application.

Step 607 is similar to step 405, and reference may be correspondingly made.

608. The server iteratively performs the foregoing steps 601 to 607, and obtains the second network until the function value of the second loss function is less than or equal to the second target value.

The second network is used for obtaining, based on the second sample image, the plurality of second processing images with definitions greater than that of the second sample image and with a motion difference.

By using step 608, if the function value of the second loss function does not meet the expectation, parameter modification may be performed on the first network by using the back propagation algorithm, to repeatedly perform the operations performed in steps 601 to 607, until the function value of the second loss function is less than or equal to the second target value at a time. In this case, it can be considered that the training of outputting, by the first network, images with a motion difference is completed, so that the trained first network is used as the second network.

In steps 601 to 608, the server trains the first network according to the second loss function, to obtain the second network, thereby completing training at the second stage, so that the second network can output the plurality of second processing images with definitions greater than that of the second sample image and with a motion difference. In some implementations, the server may alternatively not obtain the optical flow loss and/or the perceptual loss, to simplify the training process.

Figure 8:
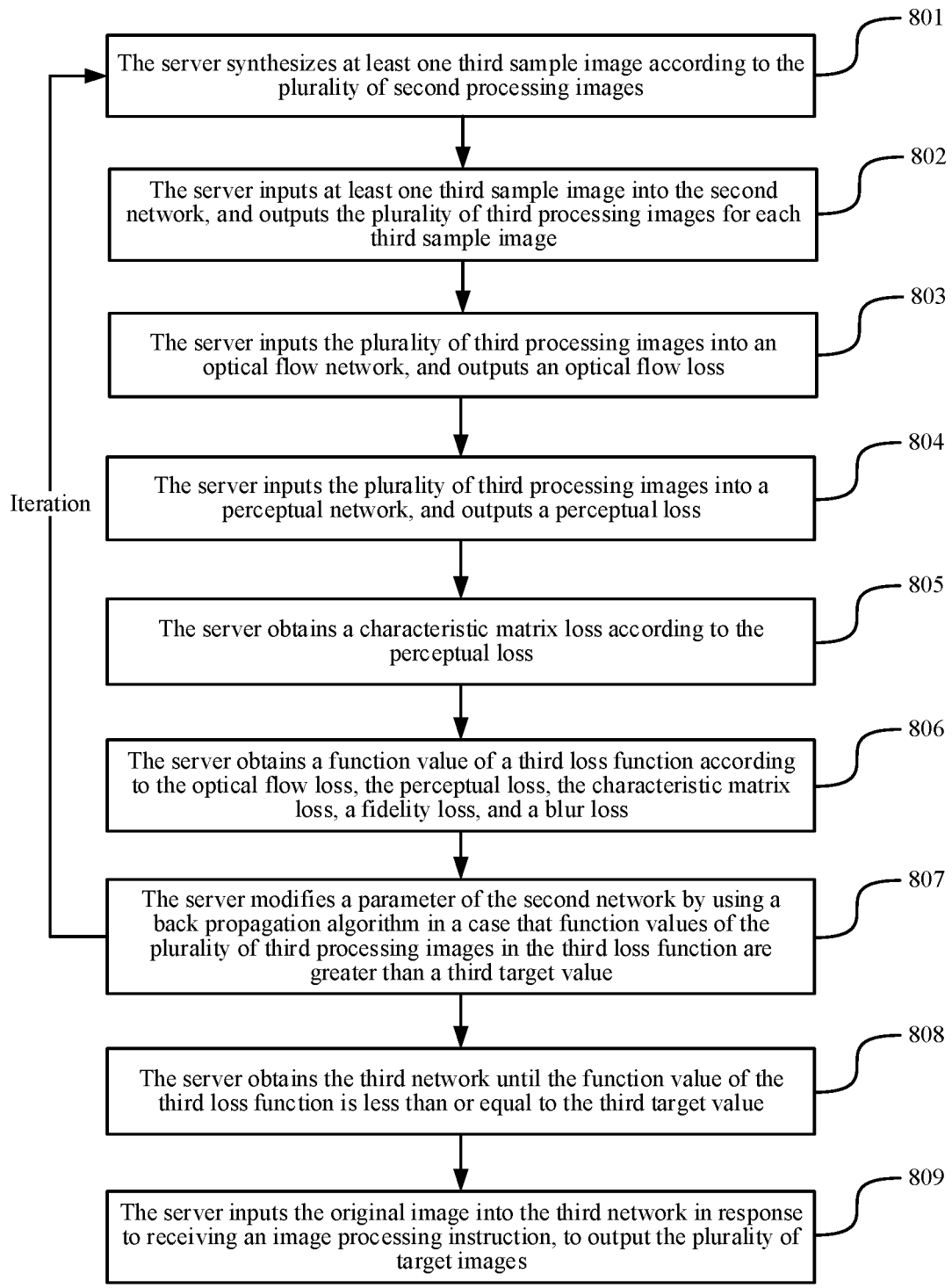
FIG. 8 is a flowchart of training a second network according to an embodiment of this application.

Based on the training at the second stage, a training method at the third stage provided in this embodiment of this application may be performed. FIG. 8 is a flowchart of training a second network according to an embodiment of this application. Referring to FIG. 8, the training method at the second stage is described below in detail.

801. The server synthesizes at least one third sample image according to the plurality of second processing images.

Figure 9:
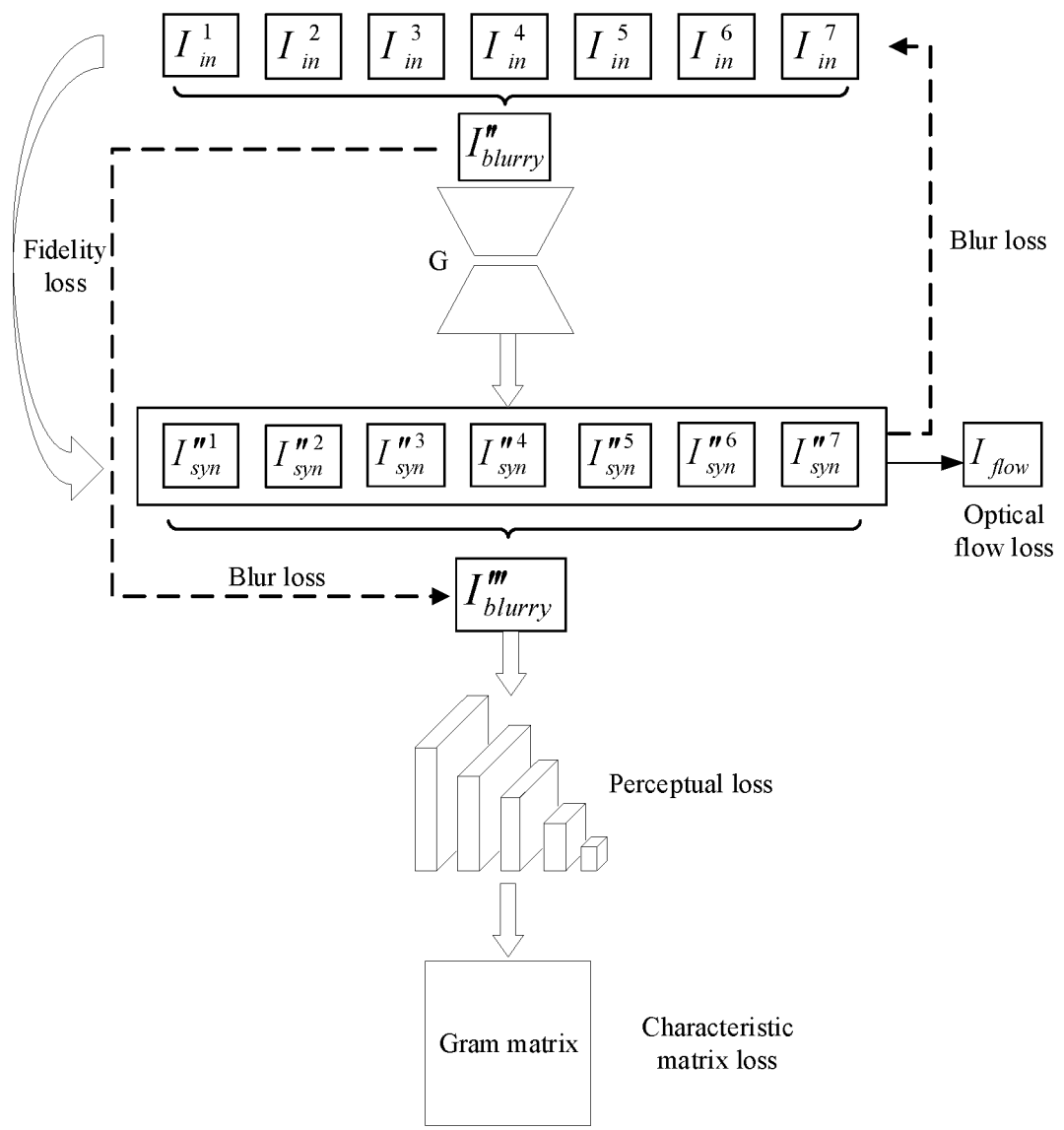
FIG. 9 is a schematic diagram of training a second network according to an embodiment of this application.

FIG. 9 is a schematic diagram of training a second network according to an embodiment of this application. As shown in FIG. 9, step 801 is similar to step 601, and reference may be correspondingly made.

802. The server inputs at least one third sample image into the second network, and outputs the plurality of third processing images for each third sample image.

Step 802 is similar to step 602 or step 401, and reference may be correspondingly made.

803. The server inputs the plurality of third processing images into an optical flow network, and outputs an optical flow loss.

Step 803 is similar to step 603 or step 402, and reference may be correspondingly made.

804. The server inputs the plurality of third processing images into a perceptual network, and outputs a perceptual loss.

Step 804 is similar to step 604 or step 403, and reference may be correspondingly made.

805. The server obtains a characteristic matrix loss according to the perceptual loss.

Step 805 is similar to step 605, and reference may be correspondingly made.

806. The server obtains a function value of a third loss function according to the optical flow loss, the perceptual loss, the characteristic matrix loss, a fidelity loss, and a blur loss.

The blur loss is used for indicating hidden difference information caused by a feature loss between the third sample image and the third processing images. The blur loss may be represented by using the following formula:

$$L_C = \frac{1}{K}\sum_{i=1}^{K}\|B(I_{in}) - B(G(B(I_{in})))\|_1 + \frac{1}{N\cdot K}\sum_{i=1}^{K}\sum_{j=1}^{N}\|I_{in}^j - G(B(I_{in}^j))\|_1 \quad (7)$$

In the foregoing formula, $I_{in}$ represents the second processing image used for synthesizing the third sample image, B represents an operation of generating a blurred image, G represents a function of the second network, K represents a quantity of the plurality of third processing images outputted by the second network each time, and N represents a quantity of third sample images.

It can be learned from the foregoing formula that the blur loss includes two parts. One part is hidden difference information between the second processing images and the third processing images. The other part is hidden difference information between the third sample image and the blurred image synthesized according to the plurality of third processing images, so that the blur loss can integrally represent the hidden difference information caused by a feature loss in the second network.

In step 806, the third loss function is used for ensuring that definitions of the plurality of third processing images are greater than that of the third sample image, there is the motion difference, and hidden information in the third sample image is recovered. The third loss function $L_3$ may include the optical flow loss $L_{flow}''$, the perceptual loss $L_{perceptual}''$, the fidelity loss $L_{MSE}''$, the characteristic matrix loss $L_{Gram}'$, and the blur loss $L_C$, and may be represented by using the following formula:

$$L_3 = L''_{flow} + L''_{MSE} + L''_{perceptual} + L'_{Gram} + L_C \qquad (8)$$

$$= \frac{1}{WH}\sum_{x=1}^{W}\sum_{y=1}^{H}\left[\left(I''^{x,y}_{flow} - G(I''^{x,y}_{blurry})\right)^2 + \left(I''^{x,y}_{sharp} - G(I''^{x,y}_{blurry})\right)^2\right] +$$

$$\left\|\Phi(I''_{sharp}) - \Phi(G(I''_{blurry}))\right\| +$$

$$\frac{1}{K}\sum_{i=1}^{K}\left\|\text{Gram}(G(I''_{blurry})) - \text{Gram}(I''_{sharp})\right\| +$$

$$\frac{1}{K}\sum_{i=1}^{K}\|B(I_{in}) - B(G(B(I_{in})))\|_1 + \frac{1}{N \cdot K}\sum_{i=1}^{K}\sum_{j=1}^{N}\left\|I^j_{in} - G(B(I^j_{in}))\right\|_1$$

The blur loss $L_C$ is the same as the foregoing, and reference may be correspondingly made. Function expressions of the optical flow loss $L_{flow}''$, the characteristic matrix loss $L_{Gram}'$, the perceptual loss $L_{perceptual}''$, and the fidelity loss $L_{MSE}''$ are similar to those in step 606, and reference may be correspondingly made.

In addition, x represents a position of a pixel of the third processing image in a width direction, y represents a position of a pixel of the third processing image in a height direction, W represents a width of the third processing image (the same as the width of the second processing image $I_{sharp}''$), H represents a height of the second processing image (the same as the height of the second processing image $I_{sharp}''$) $I_{flow}''$ represents a feature map that is extracted by the optical flow network and that represents the spatial-temporal association information of the third processing images, $\Phi$ represents a function of the perceptual network, and Gram represents an operation of obtaining a Gram matrix.

In the foregoing process, the fidelity loss is used for representing a result obtained by calculating an MSE pixel by pixel between the third processing images and the second processing images. By collaboratively considering contributions of the optical flow loss, the fidelity loss, the perceptual loss, the characteristic matrix loss, and the blur loss, not only the differences between the first processing images and the second processing images in pixels and spatial-temporal association information can be measured, but also more precise parameter adjustment can be performed in consideration of the differences between the first processing images and the second processing images in perception and motion as well as whether hidden difference information in the original blurred image is lost under the function of the second network, thereby facilitating restoring the lost original hidden information in the blurred image.

807. The server modifies a parameter of the second network by using a back propagation algorithm when function values of the plurality of third processing images in the third loss function are greater than a third target value.

The third target value may be any value greater than 0 and less than 1. The third target value may be the same as or different from the first target value and/or the second target value. The value of the third target value is not limited in this embodiment of this application.

In some embodiments, when the parameter of the second network is adjusted, the plurality of third processing images outputted during last training may be synthesized into a blurred image, to input the blurred image into the second network for training this time, thereby facilitating obtaining a value of the third loss function by using the plurality of clear third processing images as supervision information, and accelerating the training speed.

Step 807 is similar to step 607 or step 405, and reference may be correspondingly made.

808. The server iteratively performs the foregoing steps 801 to 807, and obtains the third network until the function value of the third loss function is less than or equal to the third target value.

The third network is used for obtaining, based on the third sample image, the plurality of third processing images with definitions greater than that of the third sample image, with a motion difference, and recovering hidden information in the third sample image.

By using step 808, if the function value of the third loss function does not meet the expectation, parameter modification may be performed on the second network by using the back propagation algorithm, to repeatedly perform the operations performed in steps 801 to 807, until the function value of the third loss function is less than or equal to the third target value at a time. In this case, it can be considered that the training of outputting, by the second network, an image recovering hidden information of the original blurred image is completed, so that the trained second network is used as the third network.

In steps 801 to 808, the server trains the second network according to the third loss function, to obtain the third network, so that the third network can output the plurality of third processing images with definitions greater than that of the third sample image, with a motion difference, and recovering hidden information of the third sample image. In some implementations, the server may alternatively not obtain the optical flow loss and/or the perceptual loss, to simplify the training process.

809. The server inputs the original image into the third network in response to receiving an image processing instruction, to output the plurality of target images.

In steps 401 to 406, steps 601 to 608, and steps 801 to 809, the server trains the initial network to obtain the third network, so that for an original image inputted into the third network, a plurality of target images with definitions greater than that of the original image, with a motion difference, and recovering hidden information in the original image can be outputted. The image processing instruction carries at least the original image.

"Blurred image" mentioned in the foregoing embodiments may be any image with a definition less than the first preset threshold. "Clear image" mentioned in the foregoing embodiments may be any image with a definition greater than that of the blurred image. Certainly, the clear image may be any image with a definition greater than that of the blurred image and greater than the second preset threshold. The second preset threshold is any value greater than the first preset threshold. Values of the first preset threshold and the second preset threshold are not limited in the embodiments of this application.

According to the image processing method provided in the embodiments of this application, the server trains the initial network according to the first loss function, to obtain the first network, to train a deblurring capability of a convolutional neutral network; trains the first network according to the second loss function, to obtain the second network, to train a capability of outputting, by the convolutional neutral network, a plurality of processing images with a motion difference; trains the second network according to the third loss function, to obtain the third network, to restore, to the greatest extent, the hidden information in the input image based on the second network, so that when receiving the image processing instruction, the server can process the original image according to the third network, to obtain a plurality of target images. A plurality of target images with definitions greater than that of the original image, with a motion difference, and recovering the hidden information in the original image are outputted by using one convolutional neutral network. Therefore, information exchange capabilities of the convolutional layers in the network are strong. When a larger quantity of clear pictures are required, compared with a parallel network architecture, an amount of calculation in each image processing process is reduced, to improve image processing efficiency.

Further, the optical flow loss is obtained by using the optical flow network, so that the spatial-temporal association information of the output image can be extracted in depth. The perceptual loss is obtained by using the perceptual network, so that a difference between the output image and the original clear image in perception can be extracted. Further, the characteristic matrix loss is obtained according to the perceptual loss, so that motion difference information can be obtained. Further, the blur loss is obtained, so that the hidden difference information can be measured, to precisely adjust the parameter of the convolutional neutral network.

All the foregoing optional technical solutions may be randomly combined to form optional embodiments of the present disclosure.

Figure 10:
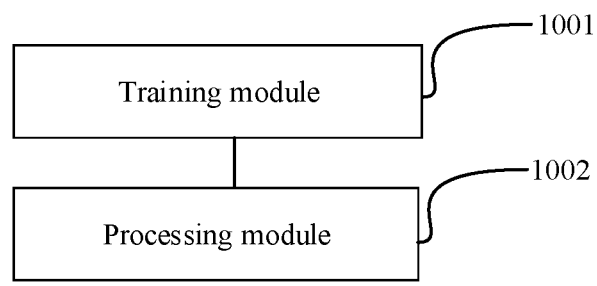
FIG. 10 is a schematic structural diagram of an image processing apparatus according to an embodiment of this application.

FIG. 10 is a schematic structural diagram of an image processing apparatus according to an embodiment of this application. Referring to FIG. 10, the apparatus includes a training module 1001 and a processing module 1002. All or some of the modules included in the image processing apparatus may be implemented by software, hardware, or a combination thereof.

The training module 1001 is configured to train an initial network, to obtain a first network, the first network being used for obtaining, based on a first sample image, a plurality of first processing images with definitions greater than that of the first sample image.

The training module 1001 is further configured to train the first network, to obtain a second network, the second network being used for obtaining, based on a second sample image, a plurality of second processing images with definitions greater than that of the second sample image and with a motion difference.

The training module 1001 is further configured to train the second network, to obtain a third network, the third network being used for obtaining, based on a third sample image, a plurality of third processing images with definitions greater than that of the third sample image, with a motion difference, and recovering hidden information in the third sample image.

The processing module 1002 is configured to process an original image according to the third network in response to receiving an image processing instruction, to obtain a plurality of target images.

According to the apparatus provided in this embodiment of this application, the server trains the initial network to obtain the first network, to train a deblurring capability of a convolutional neutral network; trains the first network, to obtain the second network, to train a capability of outputting, by the convolutional neutral network, a plurality of processing images with a motion difference; trains the second network to obtain the third network, to train a capability of restoring, by the convolutional neutral network, the hidden information in the sample image, so that when receiving the image processing instruction, the server can process the original image according to the third network, to obtain a plurality of target images. A plurality of target images with definitions greater than that of the original image, with a motion difference, and recovering the hidden information in the original image are outputted by using only one convolutional neutral network. Therefore, information exchange capabilities of the convolutional layers in the network are strong. When a larger quantity of clear pictures are required, compared with a parallel network architecture, an amount of calculation in each image processing process is reduced, to improve image processing efficiency.

In one implementation, based on composition of the apparatus of FIG. 10, the training module 1001 is further configured to input at least one first sample image into the initial network, and output the plurality of first processing images for each first sample image; modify a parameter of the initial network by using a back propagation algorithm when function values of the plurality of first processing images in the first loss function are greater than a first target value, the first loss function being used for ensuring that the definitions of the plurality of first processing images are greater than that of the first sample image; and obtain the first network until the function value of the first loss function is less than or equal to the first target value.

In one implementation, based on composition of the apparatus of FIG. 10, the training module 1001 is further configured to input the plurality of first processing images into an optical flow network, and output an optical flow loss; input the plurality of first processing images into a perceptual network, and output a perceptual loss; and obtain the function value of the first loss function according to the optical flow loss, the perceptual loss, and a fidelity loss.

In one implementation, based on composition of the apparatus of FIG. 10, the training module 1001 is further configured to input at least one second sample image into the first network, and output the plurality of second processing images for each second sample image; modify a parameter of the first network by using a back propagation algorithm when function values of the plurality of second processing images in the second loss function are greater than a second target value, the second loss function being used for ensuring that the definitions of the plurality of second processing images are greater than that of the second sample image and there is the motion difference; and obtain the second network until the function value of the second loss function is less than or equal to the second target value.

In one implementation, based on composition of the apparatus of FIG. 10, the training module 1001 is further configured to input the plurality of second processing images into an optical flow network, and output an optical flow loss; input the plurality of second processing images into a perceptual network, and output a perceptual loss; obtain a characteristic matrix loss according to the perceptual loss; and obtain the function value of the second loss function according to the optical flow loss, the perceptual loss, the characteristic matrix loss, and a fidelity loss.

In one implementation, based on composition of the apparatus of FIG. 10, the training module 1001 is further configured to input at least one third sample image into the second network, and output the plurality of third processing images for each third sample image; modify a parameter of the second network by using a back propagation algorithm when function values of the plurality of third processing images in the third loss function are greater than a third target value, the third loss function being used for ensuring that the definitions of the plurality of third processing images are greater than that of the third sample image, there is the motion difference, and the hidden information in the third sample image is recovered; and obtain the third network until the function value of the third loss function is less than or equal to the third target value.

In one implementation, based on composition of the apparatus of FIG. 10, the training module 1001 is further configured to input the plurality of third processing images into an optical flow network, and output an optical flow loss; input the plurality of third processing images into a perceptual network, and output a perceptual loss; obtain a characteristic matrix loss according to the perceptual loss; and obtain the function value of the third loss function according to the optical flow loss, the perceptual loss, the characteristic matrix loss, a fidelity loss, and a blur loss.

In one implementation, based on composition of the apparatus of FIG. 10, the training module 1001 is further configured to synthesize at least one second sample image according to the plurality of first processing images; and synthesize at least one third sample image according to the plurality of second processing images.

In one implementation, the initial network includes at least one hidden layer, and each hidden layer includes a convolutional layer, a normalization layer, and a nonlinear layer.

All the foregoing illustrative technical solutions may be combined in different manners to form other embodiments of the present disclosure.

When the image processing apparatus provided in the foregoing embodiment processes an image, it is illustrated with an example of division of each functional module. In practical application, the function distribution may be implemented by different functional modules according to requirements, that is, an internal structure of the computer device is divided into different functional modules, to implement all or some of the functions described above. In addition, the image processing apparatus provided in the foregoing embodiment belongs to the same idea as the embodiments of the image processing method. See the embodiment of the image processing method for a specific implementation process thereof.

Figure 11:
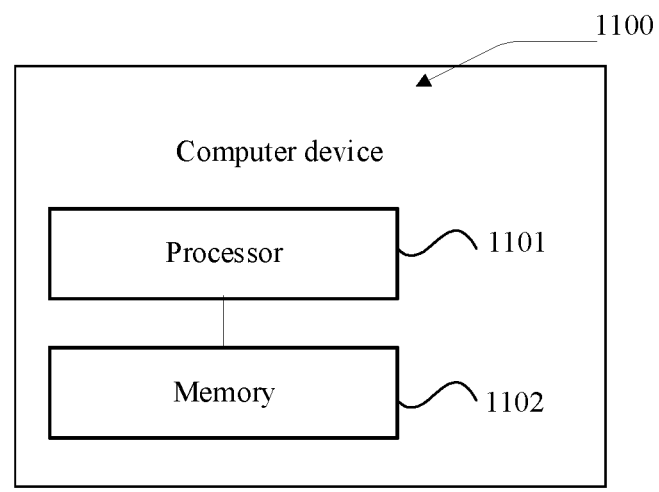
FIG. 11 is a schematic structural diagram of a computer device according to an embodiment of this application.

FIG. 11 is a schematic structural diagram of a computer device according to an embodiment of this application. The computer device 1100 may vary greatly due to different configurations or performance, and may include one or more central processing units (CPUs) 1101 and one or more memories 1102. In some embodiments, the computer device 1100 may be a smartphone, a tablet computer, a Moving Picture Experts Group Audio Layer III (MP3) player, a Moving Picture Experts Group Audio Layer IV (MP4) player, a notebook computer, or a desktop computer. The computer device 1100 may be further referred to as another name such as a terminal, a server, user equipment, a portable terminal, a laptop terminal, or a desktop terminal.

The memory 1102 stores at least one instruction. The at least one instruction is loaded and executed by the processor 1101 to implement the method provided in the foregoing embodiments of the image processing method. Certainly, the computer device may also have components such as a wired or wireless network interface, a keyboard, and an input/output interface for ease of input/output, and may further include other components for implementing functions of the device.

In an embodiment, a computer device is provided, including: a memory and a processor. The memory stores computer-readable instructions, the computer-readable instructions, when executed by the processor, causing the processor to perform the steps in the foregoing image processing method. The steps in the image processing method may be the steps in the image processing method in the foregoing embodiments.

In an embodiment, a non-transitory computer-readable storage medium is provided. The non-transitory computer-readable storage medium stores computer-readable instructions, the computer-readable instructions, when executed by the processor, causing the processor to perform the steps in the foregoing image processing method. The steps in the image processing method may be the steps in the image processing method in the foregoing embodiments.

A person of ordinary skill in the art may understand that all or some procedures in the methods in the foregoing embodiments may be implemented by a computer-readable instruction instructing relevant hardware. The program may be stored in a non-volatile computer-readable storage medium. When the program is executed, the procedures of the foregoing method embodiments may be implemented. References to the memory, the storage, the database, or other medium used in the embodiments provided in this application may all include a non-volatile or a volatile memory. The non-volatile memory may include a read-only memory (ROM), a programmable ROM (PROM), an electrically programmable ROM (EPROM), an electrically erasable programmable ROM (EEPROM) or a flash memory. The volatile memory may include a random access memory (RAM) or an external high-speed cache. For the purpose of description instead of limitation, the RAM is available in a plurality of forms, such as a static RAM (SRAM), a dynamic RAM (DRAM), a synchronous DRAM (SDRAM), a double data rate SDRAM (DDRSDRAM), an enhanced SDRAM (ESDRAM), a synchronous link (Synchlink) DRAM (SLDRAM), a RAM bus (Rambus) direct RAM (RDRAM), a direct Rambus dynamic RAM (DRDRAM), and a Rambus dynamic RAM (RDRAM).

Technical features of the foregoing embodiments may be randomly combined. To make description concise, not all possible combinations of the technical features in the foregoing embodiments are described. However, the combinations of these technical features shall be considered as falling within the scope recorded by this specification provided that no conflict exists.

The foregoing embodiments only describe several implementations of this application and in detail, but cannot be construed as a limitation to the patent scope of this application. For a person of ordinary skill in the art, several transformations and improvements can be made without departing from the idea of this application. These transformations and improvements belong to the protection scope of this application. Therefore, the protection scope of the patent of this application shall be subject to the appended claims.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

As used herein, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit. The division of the foregoing functional modules is merely used as an example for description when the systems, devices, and apparatus provided in the foregoing embodiments performs training and/or image processing. In practical application, the foregoing functions may be allocated to and completed by different functional modules according to requirements, that is, an inner structure of a device is divided into different functional modules to implement all or a part of the functions described above.

What is claimed is:

1. An image processing method, performed by a computer device, the method comprising:
    training an initial network to obtain a first network;
    processing a first sample image that includes a blurry object using the first network to obtain a plurality of first processing images having definitions greater than that of the first sample image;
    synthesizing at least one second sample image according to the plurality of first processing images;
    training the first network to obtain a second network;
    processing the at least one second sample image using the second network to obtain a plurality of second processing images with definitions greater than that of the at least one second sample image and including motion differences of the object;
    synthesizing at least one third sample image according to the plurality of second processing images;
    training the second network to obtain a third network;
    processing the at least one third sample image using the third network to obtain a plurality of third processing images having definitions greater than that of the at least one third sample image and including the motion differences of the object and recovering hidden information in the at least one third sample image; and
    processing an original image using the third network in response to receiving an image processing instruction, to obtain a plurality of target images from the original image.

2. The method according to claim 1, wherein the first sample image comprises one or more first sample images, each of the one or more first sample images including the blurry object, and training the initial network to obtain the first network comprises:
    inputting the one or more first sample images into the initial network, and outputting the plurality of first processing images for each of the one or more first sample images;
    modifying a parameter of the initial network using a back propagation algorithm when function values of the plurality of first processing images in a first loss function are greater than a first target value, the first loss function being used for determining whether the definitions of the plurality of first processing images are greater than that of the first sample image; and
    obtaining the first network in accordance with a determination that a function value of the first loss function is less than or equal to the first target value.

3. The method according to claim 2, further comprising:
    inputting the plurality of first processing images into an optical flow network, and outputting an optical flow loss;
    inputting the plurality of first processing images into a perceptual network, and outputting a perceptual loss; and
    obtaining the function value of the first loss function according to the optical flow loss, the perceptual loss, and a fidelity loss.

4. The method according to claim 1, wherein training the first network to obtain the second network comprises:
    inputting the at least one second sample image into the first network, and outputting the plurality of second processing images for each of the at least one second sample image;
    modifying a parameter of the first network by using a back propagation algorithm when function values of the plurality of second processing images in a second loss function are greater than a second target value, the second loss function being used for determining whether the definitions of the plurality of second processing images are greater than that of the at least one second sample image and including motion differences of the object; and
    obtaining the second network in accordance with a determination that a function value of the second loss function is less than or equal to the second target value.

5. The method according to claim 4, further comprising:
    inputting the plurality of second processing images into an optical flow network, and outputting an optical flow loss;
    inputting the plurality of second processing images into a perceptual network, and outputting a perceptual loss;
    obtaining a characteristic matrix loss according to the perceptual loss; and
    obtaining the function value of the second loss function according to the optical flow loss, the perceptual loss, the characteristic matrix loss, and a fidelity loss.

6. The method according to claim 1, wherein training the second network to obtain a third network comprises:
    inputting the at least one third sample image into the second network, and outputting the plurality of third processing images for each of the at least one third sample image;
    modifying a parameter of the second network by using a back propagation algorithm when function values of the plurality of third processing images in a third loss function are greater than a third target value, the third loss function being used for ensuring that the definitions of the plurality of third processing images are greater than that of the at least one third sample image and including the motion differences of the blurry object and recovering the hidden information in the third sample image; and obtaining the third network in accordance with a determination that a function value of the third loss function is less than or equal to the third target value.

7. The method according to claim 6, further comprising:
inputting the plurality of third processing images into an optical flow network, and outputting an optical flow loss;

inputting the plurality of third processing images into a perceptual network, and outputting a perceptual loss;

obtaining a characteristic matrix loss according to the perceptual loss; and obtaining the function value of the third loss function according to the optical flow loss, the perceptual loss, the characteristic matrix loss, a fidelity loss, and a blur loss.

8. The method according to claim 1, wherein the initial network comprises at least one hidden layer, and each hidden layer comprises a convolutional layer, a normalization layer, and a nonlinear layer.

9. A computer device for image processing, comprising:
one or more processors; and
memory storing one or more programs that, when executed by the one or more processors, cause the one or more processors to perform operations comprising:
training an initial network to obtain a first network;
processing a first sample image that includes a blurry object using the first network to obtain a plurality of first processing images having definitions greater than that of the first sample image;
synthesizing at least one second sample image according to the plurality of first processing images;
training the first network to obtain a second network;
processing the at least one second sample image using the second network to obtain a plurality of second processing images with definitions greater than that of the at least one second sample image and including motion differences of the object;
synthesizing at least one third sample image according to the plurality of second processing images;
training the second network to obtain a third network;
processing the at least one third sample image using the third network to obtain a plurality of third processing images having definitions greater than that of the at least one third sample image and including the motion differences of the object and recovering hidden information in the at least one third sample image; and
processing an original image using the third network in response to receiving an image processing instruction, to obtain a plurality of target images from the original image.

10. The computer device according to claim 9, wherein the first sample image comprises one or more first sample images, each of the one or more first sample images including the blurry object, and training the initial network to obtain the first network comprises:
inputting the one or more first sample images into the initial network, and outputting the plurality of first processing images for each of the one or more first sample images;
modifying a parameter of the initial network using a back propagation algorithm when function values of the plurality of first processing images in a first loss function are greater than a first target value, the first loss function being used for determining whether the definitions of the plurality of first processing images are greater than that of the first sample image; and obtaining the first network in accordance with a determination that a function value of the first loss function is less than or equal to the first target value.

11. The computer device according to claim 10, the operations further comprising:
inputting the plurality of first processing images into an optical flow network, and outputting an optical flow loss;

inputting the plurality of first processing images into a perceptual network, and outputting a perceptual loss; and obtaining the function value of the first loss function according to the optical flow loss, the perceptual loss, and a fidelity loss.

12. The computer device according to claim 9, wherein training the first network to obtain the second network comprises:
inputting the at least one second sample image into the first network, and outputting the plurality of second processing images for each of the at least one second sample image;
modifying a parameter of the first network by using a back propagation algorithm when function values of the plurality of second processing images in a second loss function are greater than a second target value, the second loss function being used for determining whether the definitions of the plurality of second processing images are greater than that of the at least one second sample image and including motion differences of the object; and
obtaining the second network in accordance with a determination that a function value of the second loss function is less than or equal to the second target value.

13. The computer device according to claim 12, further comprising:
inputting the plurality of second processing images into an optical flow network, and outputting an optical flow loss;

inputting the plurality of second processing images into a perceptual network, and outputting a perceptual loss;

obtaining a characteristic matrix loss according to the perceptual loss; and obtaining the function value of the second loss function according to the optical flow loss, the perceptual loss, the characteristic matrix loss, and a fidelity loss.

14. The computer device according to claim 9, wherein training the second network to obtain a third network comprises:
inputting the at least one third sample image into the second network, and outputting the plurality of third processing images for each of the at least one third sample image;
modifying a parameter of the second network by using a back propagation algorithm when function values of the plurality of third processing images in a third loss function are greater than a third target value, the third loss function being used for ensuring that the definitions of the plurality of third processing images are greater than that of the at least one third sample image and including the motion differences of the blurry object and recovering the hidden information in the third sample image; and obtaining the third network in accordance with a determination that a function value of the third loss function is less than or equal to the third target value.

15. The computer device according to claim 14, the operations further comprising:
   inputting the plurality of third processing images into an optical flow network, and outputting an optical flow loss;
   inputting the plurality of third processing images into a perceptual network, and outputting a perceptual loss;
   obtaining a characteristic matrix loss according to the perceptual loss; and
   obtaining the function value of the third loss function according to the optical flow loss, the perceptual loss, the characteristic matrix loss, a fidelity loss, and a blur loss.

16. The computer device according to claim 9, wherein the initial network comprises at least one hidden layer, and each hidden layer comprises a convolutional layer, a normalization layer, and a nonlinear layer.

17. A non-transitory computer-readable storage medium storing instructions that, when executed by one or more processors of a computer device, cause the one or more processors to perform operations comprising:
   training an initial network to obtain a first network;
   processing a first sample image that includes a blurry object using the first network to obtain a plurality of first processing images having definitions greater than that of the first sample image;
   synthesizing at least one second sample image according to the plurality of first processing images;
   training the first network to obtain a second network;
   processing the at least one second sample image using the second network to obtain a plurality of second processing images with definitions greater than that of the at least one second sample image and including motion differences of the object;
   synthesizing at least one third sample image according to the plurality of second processing images;
   training the second network to obtain a third network;
   processing the at least one third sample image using the third network to obtain a plurality of third processing images having definitions greater than that of the at least one third sample image and including the motion differences of the object and recovering hidden information in the at least one third sample image; and
   processing an original image using the third network in response to receiving an image processing instruction, to obtain a plurality of target images from the original image.

18. The non-transitory computer-readable storage medium according to claim 17, wherein the first sample image comprises one or more first sample images, each of the one or more first sample images including the blurry object, and training the initial network to obtain the first network comprises:
   inputting the one or more first sample images into the initial network, and outputting the plurality of first processing images for each of the one or more first sample images;
   modifying a parameter of the initial network using a back propagation algorithm when function values of the plurality of first processing images in a first loss function are greater than a first target value, the first loss function being used for determining whether the definitions of the plurality of first processing images are greater than that of the first sample image; and
   obtaining the first network in accordance with a determination that a function value of the first loss function is less than or equal to the first target value.

19. The non-transitory computer-readable storage medium according to claim 18, the operations further comprising:
   inputting the plurality of first processing images into an optical flow network, and outputting an optical flow loss;
   inputting the plurality of first processing images into a perceptual network, and outputting a perceptual loss; and
   obtaining the function value of the first loss function according to the optical flow loss, the perceptual loss, and a fidelity loss.

20. The non-transitory computer-readable storage medium according to claim 17, wherein training the first network to obtain the second network comprises:
   inputting the at least one second sample image into the first network, and outputting the plurality of second processing images for each of the at least one second sample image;
   modifying a parameter of the first network by using a back propagation algorithm when function values of the plurality of second processing images in a second loss function are greater than a second target value, the second loss function being used for determining whether the definitions of the plurality of second processing images are greater than that of the at least one second sample image and including motion differences of the object; and
   obtaining the second network in accordance with a determination that a function value of the second loss function is less than or equal to the second target value.

* * * * *